(12) United States Patent
Iesato et al.

(10) Patent No.: US 10,345,163 B2
(45) Date of Patent: Jul. 9, 2019

(54) LOAD DETECTION APPARATUS

(71) Applicants: AISIN SEIKI KABUSHIKI KAISHA, Kariya-shi (JP); MINEBEA MITSUMI Inc., Kitasaku-gun (JP)

(72) Inventors: Naoya Iesato, Kariya (JP); Yasukuni Ojima, Kariya (JP); Dohaku Inamori, Saku (JP); Kotaro Eguchi, Fujisawa (JP)

(73) Assignees: AISIN SEIKI KABUSHIKI KAISHA, Kariya-shi (JP); MINEBEA MITSUMI Inc., Kitasaku-gun (JP)

( * ) Notice: Subject to any disclaimer, the term of this patent is extended or adjusted under 35 U.S.C. 154(b) by 4 days.

(21) Appl. No.: 15/605,191

(22) Filed: May 25, 2017

(65) Prior Publication Data

US 2017/0343432 A1 Nov. 30, 2017

(30) Foreign Application Priority Data

May 26, 2016 (JP) .................................. 2016-105137

(51) Int. Cl.
*G01L 1/26* (2006.01)
*G01L 1/22* (2006.01)
(Continued)

(52) U.S. Cl.
CPC ............ *G01L 1/225* (2013.01); *G01L 1/2231* (2013.01); *G01L 1/2262* (2013.01);
(Continued)

(58) Field of Classification Search
CPC ............ G01L 1/22; G01L 1/225; G01L 25/00
See application file for complete search history.

(56) References Cited

U.S. PATENT DOCUMENTS

| 8,024,980 B2 * | 9/2011 | Arms .................... G01L 1/2225 73/761 |
| 8,256,306 B1 * | 9/2012 | Bauer ................... G01L 1/2231 73/862.474 |

(Continued)

FOREIGN PATENT DOCUMENTS

| DE | 10 2011 106 302 B3 | 9/2012 | |
| DE | 102011106302 B3 * | 9/2012 | ............... G01D 3/08 |

(Continued)

OTHER PUBLICATIONS

Extended Search Report dated Oct. 26, 2017 in European patent Application No. 17172664.9.

*Primary Examiner* — Jamel E Williams
(74) *Attorney, Agent, or Firm* — Oblon, McClelland, Maier & Neustadt, L.L.P.

(57) ABSTRACT

A load detection apparatus includes a load input portion having a input surface, and an output surface; a flexure element including on annular portion including a contacting portion configured to make contact with at least a part of the output surface, and a support portion; a set of sensors disposed on a reverse surface opposite to a surface provided with the contacting portion in the annular portion, each of the set of sensors being configured to detect distortion corresponding to an input load; a set of calculation portions configured to calculate a set of magnitudes of the load by use of respective detection results obtained by the set of sensors; and an abnormality determination portion configured to determine whether the set of sensors and the set of calculation portions have no abnormality, by comparing the set of magnitudes of the load with each other.

5 Claims, 8 Drawing Sheets

(51) Int. Cl.
 G01L 25/00 (2006.01)
 G01L 5/22 (2006.01)
(52) U.S. Cl.
 CPC .............. G01L 1/2287 (2013.01); G01L 1/26 (2013.01); G01L 5/225 (2013.01); G01L 25/00 (2013.01)

(56) References Cited

U.S. PATENT DOCUMENTS

| | | |
|---|---|---|
| 9,383,271 B2 | 7/2016 | Ojima et al. |
| 2015/0068324 A1* | 3/2015 | Ojima ....................... G01L 1/22 73/862.045 |
| 2015/0300433 A1 | 10/2015 | Yasui et al. |

FOREIGN PATENT DOCUMENTS

| | | |
|---|---|---|
| DE | 11 2013 002 711 T5 | 2/2015 |
| DE | 20 2014 010 494 U1 | 10/2015 |
| JP | 2013-250161 | 12/2013 |
| JP | 2014-101960 | 6/2014 |
| JP | 2014-102155 | 6/2014 |
| JP | 2017-3355 | 1/2017 |

\* cited by examiner

LOAD DETECTION APPARATUS

INCORPORATION BY REFERENCE

The disclosure of Japanese Patent Application No. 2016-105137 filed on May 26, 2016 including the specification, drawings and abstract is incorporated herein by reference in its entirely.

BACKGROUND

1. Technical Field

The disclosure relates to a load detection apparatus con figured to detect a load.

2. Description of Related Art

Load detection apparatuses have been used to detect loads input into various devices. The load detection apparatuses of this kind are described in Japanese Patent Application Publication No. 2013-2505161 (JP 2013-2505161 A). Japanese Patent Application Publication No. 2014-101960 (JP 2014-101960 A), and Japanese Patent Application Publication No. 2014-102155 (JP 2014-102155 A), for example.

The load detection apparatus described in JP 2013-250161 A includes a tubular peripheral wall portion, a disc-shaped portion having a disc shape, a load input portion, and sensors. A through-hole is formed in the disc-shaped portion coaxially with the peripheral wall portion, and the disc-shaped portion is supported by an inner peripheral surface of the peripheral wall portion with a gap between the disc-shaped portion and a mounting surface on which the peripheral wall portion is disposed. The load input portion is formed such that at least a pan of the load input portion facing the through-hole has a spherical shape having a diameter larger than an inside diameter of the through-hole, and the load input portion is disposed on the through-hole so that a load of a detection target is input therein. The sensors are disposed in the disc-shaped portion so as to be symmetric about a point with respect to the through-hole, and the sensors detect distortion corresponding to a load input into the load input portion.

A braking device for a vehicle described in JP 2014-101960 A is configured such that a friction member is pressed, via an electric motor, against a rotational member fixed to a wheel of the vehicle so as to generate a braking toque in the wheel. The electric braking device for the vehicle includes a pressing member, a shaft member, a first, spherical surface member, a second spherical surface member, acquisition means, and control means. The pressing member has a thread part of either one of a nut equivalent portion and a bolt equivalent portion, and applies a pressing force to the friction member. The shaft member is rotationally driven by an electric motor and threadedly engaged with the thread part. The first spherical surface member receives a reaction force due to a pressing force, horn one of the pressing member and the shaft member, and has a spherical surface formed on its end surface. The second spherical surface member is configured such that its rotational motion with respect to the rotating shaft of the shaft member is restricted, and the second spherical surface member makes slide contact with the spherical surface of the first spherical surface member so as to receive a reaction force due to the pressing force, from the first spherical surface member. The acquisition means detects distortion of the second spherical surface member and acquires the pressing force based on the distortion. The control means controls the electric motor based on the pressing force.

The load detection apparatus described in JP 2014-102155 A includes a load input portion, a disc-shaped portion having a disc shape, and a support member. The load input portion includes an input surface into which a load from a detection target is input, and a curved output surface formed on a side opposite to the input surface, so as to output the load from the output surface. The disc-shaped portion having a disc shape includes a contacting portion making contact with a curved surface of the load input portion at a continuous circular line or a broken circular line around a center of the load input portion. The support member supports the disc-shaped portion with a gap between the disc-shaped portion and a mounting surface. Further, in the load detection apparatus, a diameter range of the input surface is set based on a diameter of the contacting portion that changes in accordance with bending of the disc-shaped portion due to an input load.

SUMMARY

In the techniques described in JP 2013-250161 A, JP 2014-101960 A, and JP 2054-102155 A, even in a case where for example, a detection portion, a member (a "flexure element" described above) that converts an applied load into distortion, or the like has an abnormality (e.g., non-standard (irregular) performance change, electrical disconnection, electrical short circuit, or deformation) caused due to deterioration over time, unpredictable physical stress, or electrical stress, if an electrical signal has an apparent feature, the abnormality can be detected by a function of a signal processing circuit. However, for example, when an abnormality occurs due to a non-standard performance change or the like, it is not possible to determine whether an obtained electrical signal is appropriate, and thus, it is not possible to determine whether the abnormality occurs.

In view of this, a load detection apparatus that can appropriately determine whether an abnormality occurs has been demanded.

A load detection apparatus according to an aspect of the disclosure includes a load input portion having a planar input surface into which a load is input, and an output surface provided on a side opposite to the input surface such that the output surface projects; a flexure element including an annular portion including a contacting portion configured to make contact with at least a part of the output surface, and a support portion configured to support the annular portion such that the annular portion is swingable; a set of sensors disposed on a reverse surface opposite to a surface provided with the contacting portion in the annular portion, each of the set of sensors being configured to detect distortion corresponding to the load input into the load input portion; a set of calculation portions configured to calculate a set of magnitudes of the load by use of respective detection results obtained by the set of sensors; and an abnormality determination portion configured to determine whether the set of sensors and the set of calculation portions have no abnormality, by comparing the set of magnitudes of the load with each other.

For example, if one of the set of sensors has an abnormality, detection results obtained by the sensors are different from each other, and if one of the set of calculation portions has an abnormality, calculation results obtained by the calculation portions are different from each other. In view of this, in the above configuration, a set of the magnitudes of the load calculated by the set of calculation portions are compared with each other, and when a difference therebetween is a preset value or less, it is possible to determine that the set of sensors and the set of calculation portions have no abnormality, and when the difference therebetween is larger than the preset value, it is possible to determine that, one of the set of sensors and one of the set of calculation portions, for example, have an abnormality. Thus, with the load detection apparatus of the present aspect, it is possible to appropriately determine whether an abnormality occurs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A first embodiment will be described. A load detection apparatus of the disclosure includes sensors and calculation portions, and is configured to have a function of determining whether the sensors and the calculation portions have no abnormality. The following describes a load detection apparatus 100 of the present embodiment.

Figure 1:
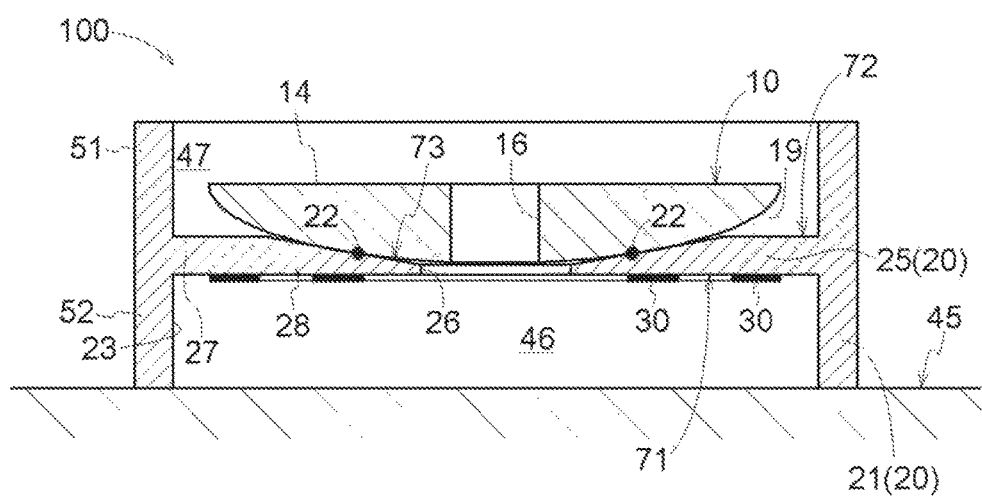
FIG. 1 is a view schematically illustrating a side section of a load detection apparatus.
Figure 2:
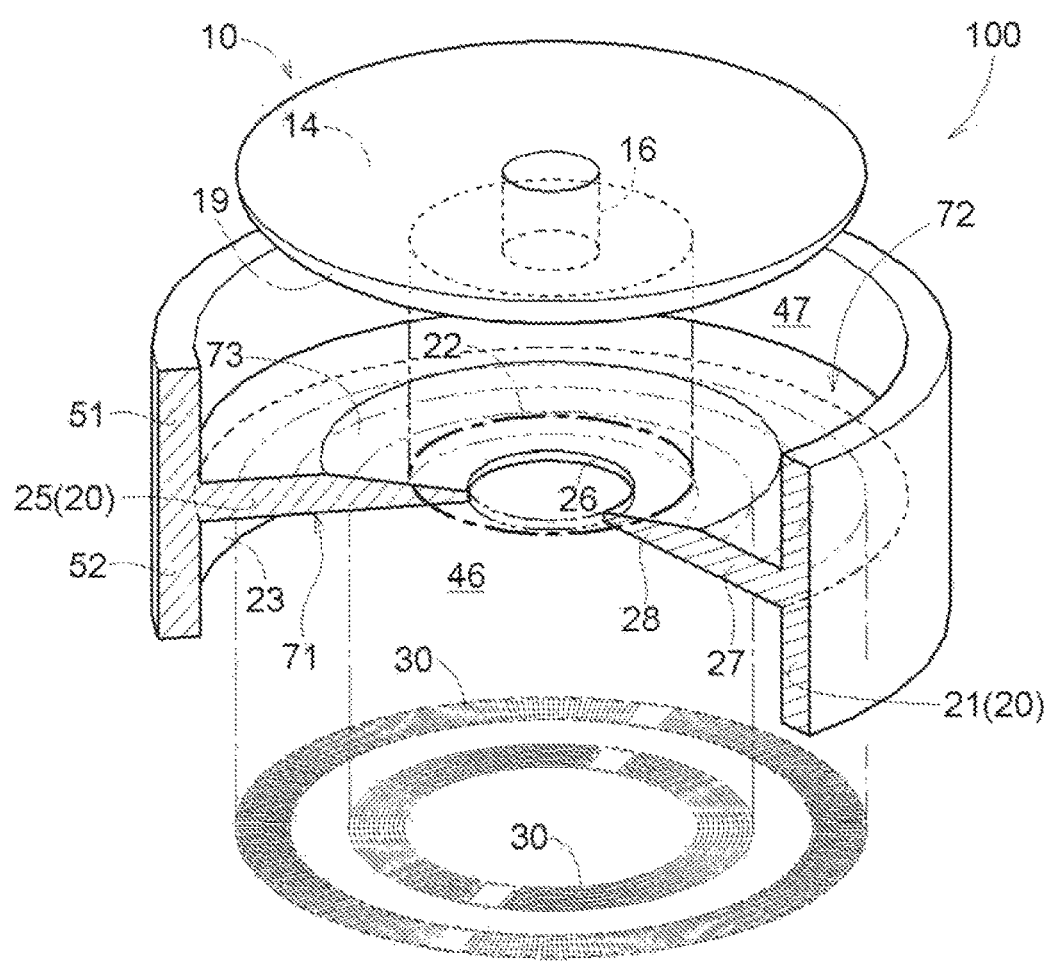
FIG. 2 is an exploded perspective view schematically illustrating the load detection apparatus.
Figure 3:
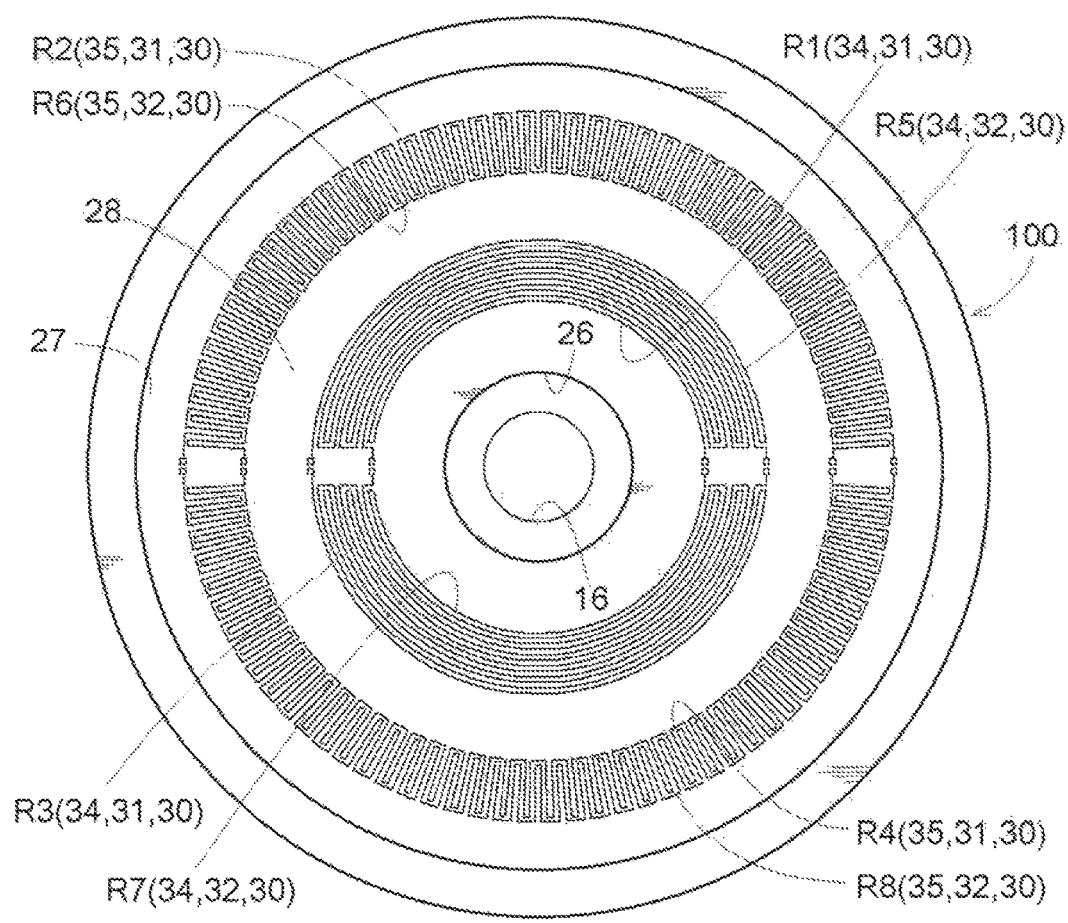
FIG. 3 is a view of a load detection apparatus of a first embodiment, when viewed from below.
Figure 4:
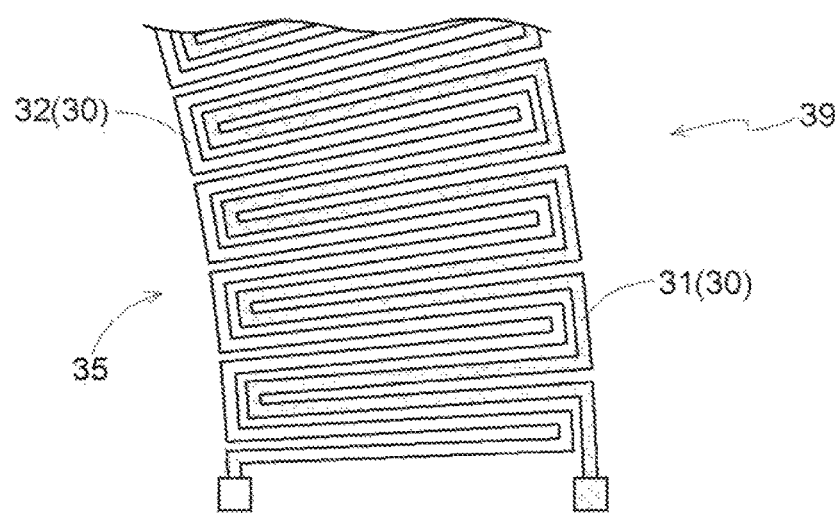
FIG. 4 is a view illustrating a part of sensors in an enlarged manner.
Figure 5:
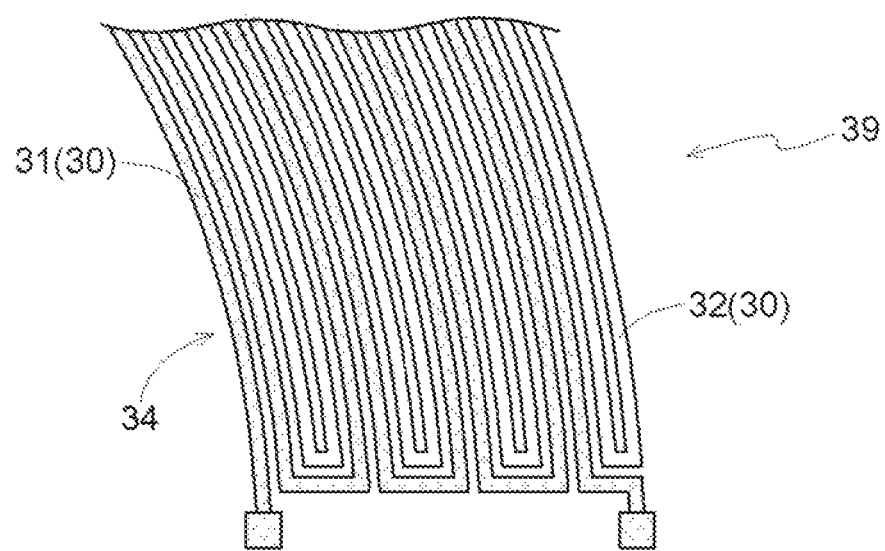
FIG. 5 is a view illustrating a part of the sensors in an enlarged manner.
Figure 6:
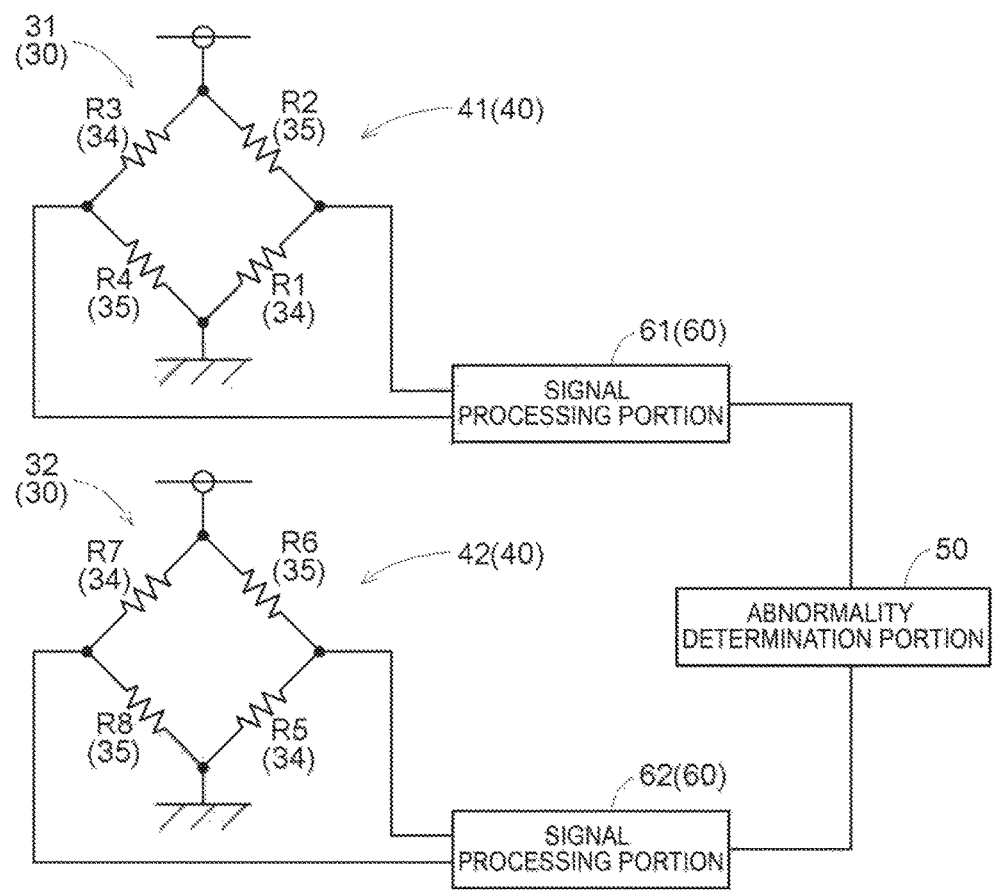
FIG. 6 is a view illustrating a connection mode between the sensors and calculation portions.

FIG. 1 is a side sectional view of the load detection apparatus 100 of the present embodiment. FIG. 2 is an exploded perspective view illustrating a section of a part of the load detection apparatus 100. FIG. 3 is a schematic view of the load detection apparatus 100 when viewed from below. FIGS. 4 and 5 are views illustrating a part of sensors 30 included in the load detection apparatus 100 in an enlarged manner. FIG. 6 illustrates a connection mode between the sensors 30 and calculation portions 40 included in the load detection apparatus 100. As illustrated in FIGS. 1 to 6, the load detection apparatus 100 includes a load input portion 10, a flexure element 20, the sensors 30, the calculation portions 40, and an abnormality determination portion 50.

The load input portion 10 includes a planar input surface 14 into which a load from a detection target is input, and a curved output surface 19 formed on a side opposite to the input surface 14 such that the output surface 19 projects. A load is output from the output surface 19. In the present embodiment, the load input portion 10 is formed in a shape of an object with a smaller volume when a sphere is cut at a position deviating from its center or a shape of an object with a smaller volume when an elliptical sphere is cut at a position deviating from its center along a direction parallel to its long axis, for example. Accordingly, the load input portion 10 is formed in a flat shape in a side view as illustrated in FIG. 1. The input surface 14 is provided on a plane formed when such cutting is performed. Meanwhile, the output surface 19 is a reverse surface opposite to the input surface 14. The output surface 19 is configured such that at least a part of the output surface 9 makes contact with the after-mentioned annular portion 25, and a load input into the input surface 14 is output to the annular portion 25.

Further, in the present embodiment, the load input portion 10 has a hole portion 16 extending therethrough in its axial direction. Accordingly, the load input portion 10 is formed in a disc shape in a top view. Further, as illustrated in FIGS. 1 and 2, an outside diameter of the load input portion 10 is smaller than an inside diameter of a support portion 21 (described later). Accordingly, the load input portion 10 is configured such that the load input portion 10 can be accommodated in a space 47.

The flexure element 20 includes the support portion 21 and an annular portion 25. In the present embodiment, the support portion 21 has a tubular shape, in other words, a cylindrical shape. That is, the support portion 21 is formed in a tubular shape such that its section perpendicular to the axial direction is circular.

The annular portion 25 is formed in a disc shape, and includes a contacting portion 22 making contact with a curved surface of the load input portion 10 at a continuous circular line or a broken circular line around a center of the load input portion 10. Accordingly, the contacting portion 22 is configured so as to make contact with at least a part of the output surface 19. In the present embodiment, a through-hole 26 is formed in a central part of the annular portion 25, and the through-hole 26 extends through the annular portion 25 in the axial direction. Accordingly, the annular portion 25 is formed into a so-called doughnut shape. The annular portion 25 is fixed such that an outer peripheral surface of the annular portion 25 contacts an inner peripheral surface 23 of the support portion 21. In this case, fixation between the support portion 21 and the annular portion 25 is preferably performed so that a load applied to the annular portion 25 is not attenuated when the load is transmitted to the support portion 21. Therefore, the annular portion 25 is swingably supported by the support portion 21.

The support portion 21 and the annular portion 25 are preferably formed integrally with the use of a material deformable upon receipt of a load, e.g., a material such as ceramic, aluminum, and stainless. However, the support portion 21 and the annular portion 25 may be formed separately, provided that the load applied to the annular portion 25 is not attenuated when the load is transmitted to the support portion 21.

The annular portion 25 is supported by the support portion 21 with a gap between the annular portion 25 and a mounting surface 45. In the present embodiment, the annular portion 25 is supported at an axially central part of the support portion 21. That is, the annular portion 25 is supported by an inner peripheral surface 23 of the support portion 21 while being distanced from both axial ends of the support portion 21. Therefore, when the support portion 21 is disposed on the mounting surface 45 with one axial end serving as a bottom portion, a gap is formed between the annular portion 25 and the mounting surface 45. Accordingly, when a part of the support portion 21 on an opposite side of the annular portion 25 from the mourning surface 45 is a first support portion 51 and a pan of the support portion 21 closer to the mounting surface 45 than the annular portion 25 is a second support portion 52, a space 46 is formed by the second support portion 52, the annular portion 25, and the mounting surface 45. Meanwhile, a space 47 is formed by an axial end surface of the first support portion 51, the first support portion 51, and the annular portion 25.

Further, the annular portion 25 includes an outer ring portion 2 and an inner ring portion 28. As illustrated in FIG. 3, the outer ring portion 27 and the inner ring portion 28 are formed continuously if a radial direction. When the annular portion 25 is viewed in the axial direction, a radially outer part corresponds to the outer ring portion 27. Further, a radially inner part relative to the outer ring portion 27 corresponds to the inner ring portion 28. In the present embodiment, the outer ring portion 27 is formed to have a uniform thickness. Meanwhile, the inner ring portion 28 is formed to be reduced in thickness toward the radially inner side. As described above, the through-hole 26 is formed in a central part of the annular portion 25 in the radial direction. Therefore, the inner ring portion 28 is formed so as to become gradually thinner toward the through-hole 26 from a border with the outer ring portion 27. In the present embodiment, as illustrated in FIG. 1, when the annular portion 25 is viewed from the radially outer side, the outer ring portion 27 and the inner ring portion 28 are formed such that a surface 71 of the annular portion 25, which faces the mounting surface 45, is flat, and a taper portion 73 is formed on the radially inner side of a surface 72 opposite to the surface 71 of the annular portion 25.

The annular portion 25 includes the taper portion 73 at a radially central pan. In the present embodiment, the load input portion 10 is disposed on the taper portion 73. Accordingly, the load input portion 10 can make line contact with the taper portion 73 in an annular shape without penetrating through the through-hole 26. The line-contact part corresponds to the contacting portion 22. In FIG. 2, the contacting portion 22 is indicated by an alternate long and short dash line.

Further, as described above, the hole portion 16 extending through the load input portion 10 in the axial direction is provided in the load input portion 10 in the present embodiment. The load input portion 10 is disposed on the annular portion 25 such that an axis of the hole portion 16 is coaxial with an axis of the through-hole 26.

The sensors 30 are disposed (i.e., a set of sensors 30 is disposed) on a reverse surface opposite to a surface provided with the contacting portion 22 in the annular portion 25, and each of the sensors 30 is configured to detect distortion corresponding to a load input into the load input portion 10. In the following description, in order to facilitate understanding, in a case where the sensors 30 are described separately, one of the sensors 30 is referred to as a sensor 31 (a first sensor), and another is referred to as a sensor 32 (a second sensor).

In the present embodiment, each of the sensors 30 is configured with the use of a well-known strain gauge. The strain gauge is configured such that, when a load is input from outside, the strain gauge is distorted so that a resistance value changes, and thus, the distortion can be detected based on the change in the resistance value. The sensors 30 are disposed on the surface 71 of the annular portion 25. Thus, when the annular portion 25 is distorted (bent) and deformed due to a load input into the load input portion 10, the sensors 30 are distorted due to the deformation. The load detection apparatus 100 detects the load by detecting the distortion of the sensors 30.

Each of the sensors 30 (the sensors 31, 32) includes a comb-shaped portion 30 having a comb shape in a top view as illustrated in FIGS. 4 and 5. The "comb-shape" indicates a state where a plurality of projecting portions is formed so as to project in a predetermined direction from a root side, like teeth of a comb.

A plurality of sensors 31 is provided, and a plurality of sensors 32 is also provided. The plurality of sensors 31 and the plurality of sensors 32 constitute a first sensor group 34 and a second sensor group 35. In the present embodiment, the first sensor group 34 and the second sensor group 35 are formed in the aforementioned comb shape.

In the first sensor group 34, the sensors 30 are disposed around the through-hole 26 such that an extending direction of the projecting portions extends along the circumferential direction of the through-hole 26 (a sensing direction of the sensor 31 extends along a circumferential direction of the through-hole 26). A state where "the extending direction of die projecting portions extends along the circumferential direction of the through-hole 26" indicates a state where the sensors 30 are disposed such that the extending direction of the projecting portions is parallel to the circumferential direction of the through-hole 26. In the present embodiment, the first sensor group 34 includes a comb-shaped portion 39 of the sensor 31 and a comb-shaped portion 39 of the sensor 32. These comb-shaped portions 39 are disposed so as to face each other around the through-hole 26.

Thus, when an external force is applied to the load input portion 10, the inner ring portion 28 bends downward. At this time, a tensile force acts in the inner ring portion 28 along the circumferential direction of the through-hole 26. Therefore, the first sensor group 34 mainly detects tensile distortion.

Further, the second sensor group 35 is disposed around the through-hole 26 such that an extending direction of the projecting portions of the comb-shaped portion 39 extends along a radial direction of the through-hole 26. A state where "the extending direction of the projecting portions extends along the radial direction of the through-hole 26" indicates a state where the projecting portions are disposed coaxially with the through-hole 26. In the present embodiment, the second sensor group 35 also includes a comb-shaped portion 39 of the sensor 31 and a comb-shaped portion 39 of the sensor 32. These comb-shaped portions 39 are disposed so as to face each other around the through-hole 26.

Thus, when an external force is applied to the load input portion 10, the inner ring portion 28 bends downward. At this time, the outer ring portion 27 also bends, so that a compressive force is applied to the reverse surface of the outer ring portion 27. Thus, the second sensor group 35 mainly detects compressive distortion.

Particularly, in the present embodiment, the sensor 31 and the sensor 32 are disposed such that their respective comb-shaped portions 39 engage with each other. A state where "their respective comb-shaped portions 39 engage with each other" indicates a state where the sensor 31 and the sensor 32 are disposed such that a projecting portion of one of the sensor 31 and the sensor 32 is sandwiched between two adjacent projecting portions of the other of the sensor 35 and the sensor 32.

With the configuration, the set of sensors can be disposed closer to each other. Thus, this arrangement makes it possible to decrease a difference between detection results obtained by the set of sensors. Accordingly, it is possible to accurately determine whether the set of sensors and the set of calculation portions have no abnormality.

The calculation portions 40 calculate (i.e., a set of calculation portions 40 calculates) a set of magnitudes of a load by the use of respective detection results obtained by the set of sensors 30. In the following description, in order to facilitate understanding, in a case where the calculation portions 40 are described separately, one of the calculation portions 40 is referred to as a calculation portion 41 (a first calculation portion), and another is referred to as a calculation portion 42 (a second calculation portion).

In the present embodiment, in each of the calculation portions 40, a Wheatstone bridge circuit is configured, as illustrated in FIG. 6, by serially connecting two strain gauges facing each other in the radial direction among four strain gauges constituting each of the first sensor group 34 and the second sensor group 35. Here, in the sensors strain gauges constituting the first sensor group 34 are referred to as R1, R3, and in the sensors 31, strain gauges constituting the second sensor group 35 are referred to as R2, R4. Further, in the sensors 32, strain gauges constituting the first sensor group 34 are referred to as R5, R7, and in the sensors 32, strain gauges constituting the second sensor group 35 are referred to as R6, R8. Each Wheatstone bridge circuit is constituted by the strain gauges as illustrated in FIG. 6. A resistance value increases when a tensile force is applied to the strain gauges, and a resistance value decreases when a compressive force is applied to the strain gauges. A change in the resistance value is obtained based on a change in a voltage or a current, and thus, a load is detected. Since such a Wheatstone bridge circuit is well known, a description thereof is omitted.

Since the load detection apparatus 100 is configured as described above, when a load is applied to the load input portion 10, tensile distortion can be caused in the first sensor group 34, and compressive distortion can be caused in the second sensor group 35. Accordingly, the load can be detected with high sensitivity.

Here, as described above, the load detection apparatus 100 includes the set of sensors 30 (the sensors 31, 32). The calculation portion 41 is configured with the use of the sensors 31, and the calculation portion 42 is configured with the use of the sensors 32. Calculation results (outputs of the Wheatstone bridge circuits) obtained by the set of calculation portions 40 are transmitted to respective signal processing portions 60 including a signal processing portion 61 and a signal processing portion 62.

The signal processing portions 60 perform zero point adjustment, zero point temperature correction, sensitivity temperature correction, linearity correction, disconnection detection for the strain gauges, and the like by use of a well-known operational amplifier, microcomputer, or the like. Since these processes are well-known, descriptions thereof are omitted. Respective detection results obtained by the set of signal processing portions 60 are transmitted to the after-mentioned abnormality determination portion 50.

The abnormality determination portion 50 compares a set of magnitudes of the load so as to determine whether the sensors 30 and the calculation portions 40 have no abnormality. That is, the calculation result of the magnitude of the load obtained by the calculation portion 41 (i.e., the magnitude of the load calculated by the calculation portion 41) and the calculation result of the magnitude of the load obtained by the calculation portion 42 (i.e., the magnitude of the load calculated by the calculation portion 42) are transmitted to the abnormality determination portion 50, and the abnormality determination portion 50 compares the magnitudes of the two calculation results. When a difference between the two calculation results is a preset value or less, the abnormality determination portion 50 determines that the sensors 30 and the calculation portions 40 have no abnormality, and when the difference between the two calculation results is larger than the preset value, the abnormality determination portion 50 determines that the sensors 30 and the calculation portions 40 have an abnormality. The "preset value" may be set in view of variations in resistance values of the sensors 30 and calculation tolerances of the calculate portions 40.

More specifically, for example, if one of the set of sensors 30 has an abnormality, the detection results obtained by the sensors are different from each other, and if one of the set of calculation portions 40 has an abnormality, the calculation results obtained by the calculation portions 40 are different from each other. In view of this, with the above configuration, a set of the magnitudes of the load calculated by the set of calculation portions 40 are compared with each other, and when the difference therebetween is the preset value or less, it is possible to determine that the set of sensors 30 and the set of calculation portions 40 have no abnormality, and when the difference therebetween is larger than the preset value, it is possible to determine that one of the set of sensors 30 and one of the set of calculation portions 40, for example, have an abnormality. Thus, with the load detection apparatus of the present embodiment, it is possible to appropriately determine whether an abnormality occurs.

Thus, the load detection apparatus 100 can determine whether the sensors 30 and the calculation portions 40 have no abnormality. Accordingly, it is possible to prevent occurrence of a situation where other devices, which use a detection result obtained by the load detection apparatus 100, use an erroneous result as a detected load, by mistake.

Next, a second embodiment will be described. In the first embodiment the sensors 30 are disposed over an entire circumference along the circumferential direction of the load input portion 10. However, the second embodiment is different from the first embodiment in that sensors 30 are not disposed over an entire circumference along a circumferential direction of a load input portion 10. The other configurations of the second embodiment are similar to those in the first embodiment, so the following description mainly deals with different points from the first embodiment.

Figure 7:
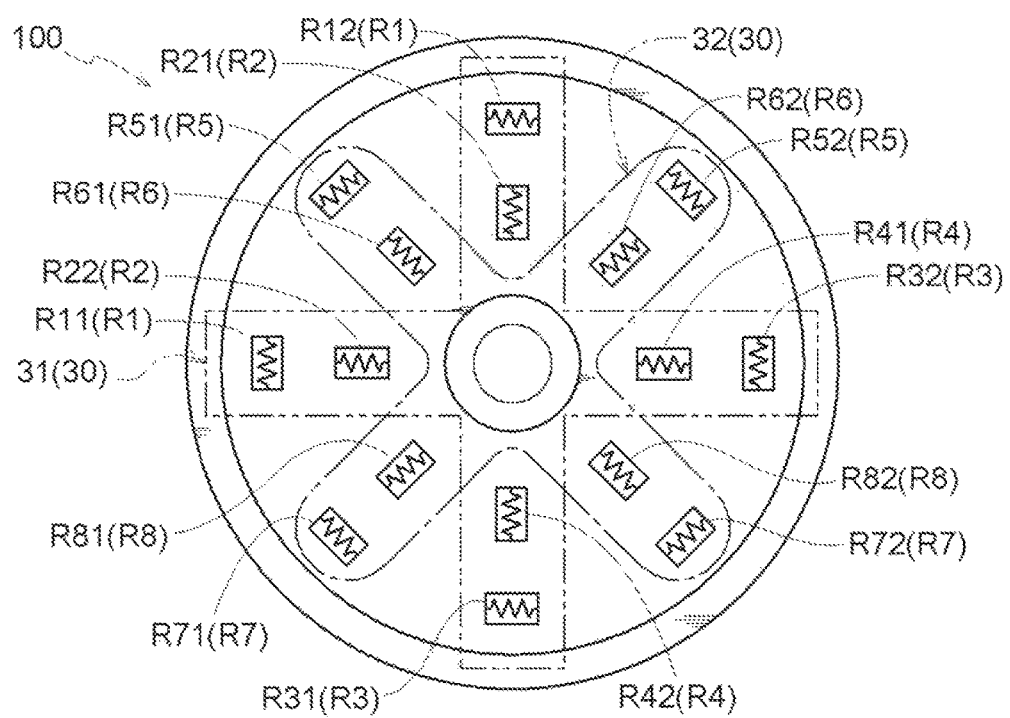
FIG. 7 is a view of a load detection apparatus of a second embodiment, when viewed from below.

FIG. 7 is a view of a load detection apparatus 100 of the second embodiment, when viewed from below. Also in the present embodiment, sensors 30 are constituted by a set of sensors 31 and sensors 32, and the sensors 30 are disposed at intervals along the circumferential direction of the load input portion 10.

For example, when a load is evenly input into the load input portion 10, the sensors 31, 32 detect similar distortion, which does not cause any problem. With the above configuration, even when an uneven load is input into the load input portion 10, it is possible to prevent occurrence of a situation where the set of sensors 30 (the sensors 31, 32) are all damaged, because the sensors 30 are disposed at intervals.

Even in the present embodiment, in the sensors 31, strain gauges constituting a first sensor group 34 are referred to as R1, R3, and in the sensors 31, strain gauges constituting a second sensor group 35 are referred to as R2, R4. The strain gauge R1 is configured such that two strain gauges R11, R12 are serially connected to each other, the strain gauge R2 is configured such that two strain gauges R21, R22 are serially connected to each other, the strain gauge R3 is configured such that two strain gauges R31, R32 are serially connected to each other, and the strain gauge R4 is configured such that two strain gauges R41, R42 are serially connected to each other. Further, in the sensors 32, strain gauges constituting the first sensor group 34 are referred to as R5, R7, and in the sensors 32, strain gauges constituting the second sensor group 35 are referred to as R6, R8. The strain gauge R5 is configured such that two strain gauges R51, R52 are serially connected to each other, the strain gauge R6 is configured such that two strain gauges R61, R62 are serially connected to each other, the strain gauge R7 is configured such that two strain gauges R71, R72 are serially connected to each other, and the strain gauge R8 is configured such that two strain gauges R81, R82 are serially connected to each other.

As illustrated in FIG. 7, the strain gauges R1 to R8 are disposed such that the strain gauges R11, R12, R31, R32 in the sensors 31 constituting the first sensor group 34 are disposed at intervals of 90 degrees along the circumferential direction of the load input portion 10, and on a radially inner side relative thereto, the strain gauges R21, R22, R41, R42 in the sensors 31 constituting the second sensor group 35 are disposed at intervals of 90 degrees along the circumferential direction of the load input portion 10.

Further, the strain gauges R51, R52, R71, R72 in the sensors 32 constituting the first sensor group 34 are disposed at intervals of 90 degrees along the circumferential direction of the load input portion 10, and on the radially inner side relative thereto, the strain gauges R61, R62, R81, R82 in the sensors 32 constituting the second sensor group 35 are disposed at intervals of 90 degrees along the circumferential direction of the load input portion 10. In this case, the strain gauges of the sensors 31 and the strain gauges of the sensors 32 are disposed so as to be shifted from each other by 45 degrees along the circumferential direction of the load input portion 10.

That is, similarly to the example of FIG. 3, in the example of FIG. 7, the strain gauges on the radially outer side are set to detect distortion along the circumferential direction (grid directions of the strain gauges are set to the circumferential direction), and the strain gauges on the radially inner side are set to detect distortion along the radial direction (grid directions of the strain gauges are set to the radial direction). The strain gauges on the radially outer side may be set to detect distortion along the radial direction (the grid directions of me strain gauges may be set to the radial direction), and the strain gauges on the radially inner side may be set to detect distortion along the circumferential direction (the grid directions of the strain gauges may be set to the circumferential direction).

Further, in the example of FIG. 7, two strain gauges serially-connected and constituting each of the strain gauge R1 to the strain gauge R8 (e.g., the strain gauge R21 and the strain gauge R22 constituting the strain gauge R2) are disposed at positions shifted from each other by 90 degrees. However, two strain gauges serially-connected and constituting each of the strain gauge R1 to the strain gauge R8 may be disposed at positions shifted from each other by 180 degrees (at positions facing each other along the radial direction). With the configuration, the strain gauges function as a canceler at the time when an uneven load is applied to the sensors 30.

In the configuration, similarly to the load detection apparatus 100 of the first embodiment, it is possible to appropriately determine whether the sensors 30 and the calculation portions 40 have no abnormality.

Next, a third embodiment will be described. In the first embodiment, the set of sensors 30 is disposed such that their respective comb-shaped portions 39 engage with each other. However, the third embodiment is different from the first embodiment in that a set of sensors 30 is configured such that their respective comb-shaped portions 39 do not engage with each other. The other configurations of the third embodiment are similar to those in the first embodiment, so the following description mainly deals with different points from the first embodiment.

Figure 8:
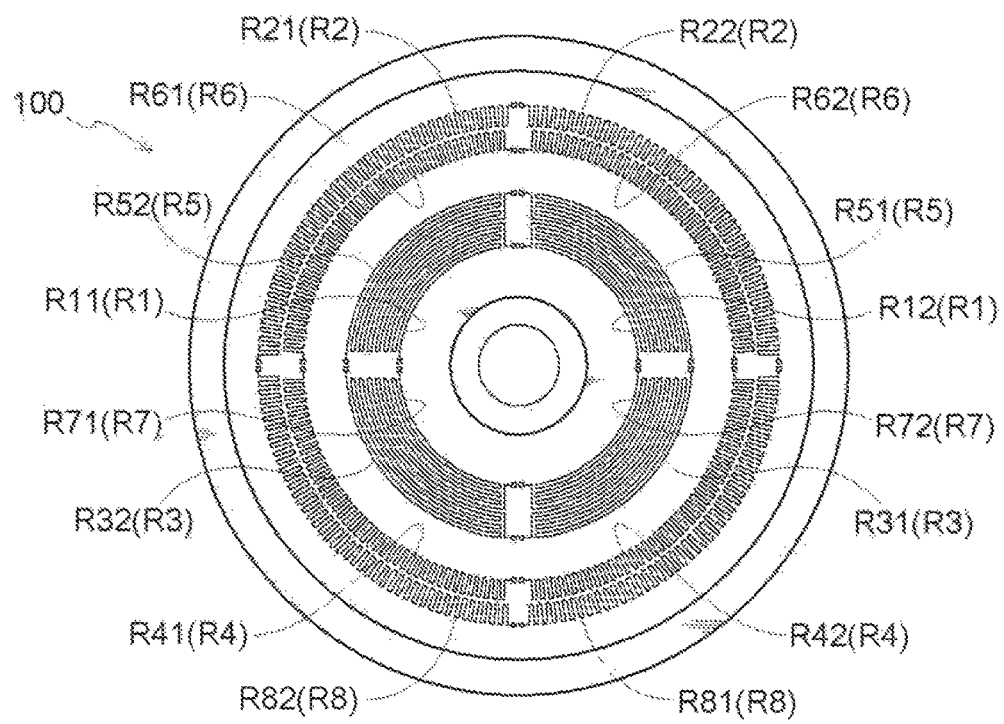
FIG. 8 is a view of a load detection apparatus of a third embodiment, when viewed from below.

FIG. 8 is a view of a load detection apparatus 100 of she third embodiment, when viewed from below. In the present embodiment, sensors 30 are constituted by a set of sensors 31 and sensors 32, and the sensors 30 are disposed in parallel to each other along a circumferential direction of a load input portion 10. In the present embodiment, the sensors 30 include comb-shaped portions 39, and the comb-shaped portions 39 are disposed so as not to engage with each other.

With the configuration, the set of the sensors 30 (the sensors 31, 32) can be disposed at substantially the same position in the flexure element without complicating the structures of the sensors 30 (the sensors 31, 32). Accordingly, a simple structure can be achieved while detection accuracy is maintained.

In the configuration, similarly to the load detection apparatus 100 of the first embodiment, it is possible to appropriately determine whether the sensors 30 and the calculation portions 40 have no abnormality. Further, similarly to the second embodiment, a strain gauge R1 may be configured such that two strain gauges R11, R12 are serially connected to each other, a strain gauge R2 may be configured such that two strain gauges R21, R22 are serially connected to each other, a strain gauge R3 may be configured such that two strain gauges R31, R32 are serially connected to each other, and a strain gauge R4 may be configured such that two strain gauges R41, R42 are serially connected to each other. Further, in the sensors 32, strain gauges constituting a first sensor group 34 are referred to as R5, R7, and in the sensors 32, strain gauges constituting a second sensor group 35 are referred to as R6, R8. The strain gauge R5 may be configured such that two strain gauges R51, R52 are serially connected to each other, the strain gauge R6 may be configured such that two strain gauges R61, R62 are serially connected to each other, the strain gauge R7 may be configured such that two strain gauges R71, R72 are serially connected to each other, and the strain gauge R8 may be configured such that two strain gauges R81, R82 are serially connected to each other.

Next, a fourth embodiment will be described. The first embodiment deals with a case where the sensors 30 are disposed on the reverse surface opposite to the surface provided with the contacting portion 22 in the annular portion 25. However the fourth embodiment is different from the first, embodiment in that sensors 30 are stacked on a reverse surface opposite to a surface provided with a contacting portion 22 in an annular portion 25. The other configurations of the fourth embodiment are similar to those in the first embodiment, so the following description mainly deals with different points from the first embodiment.

Figure 9:
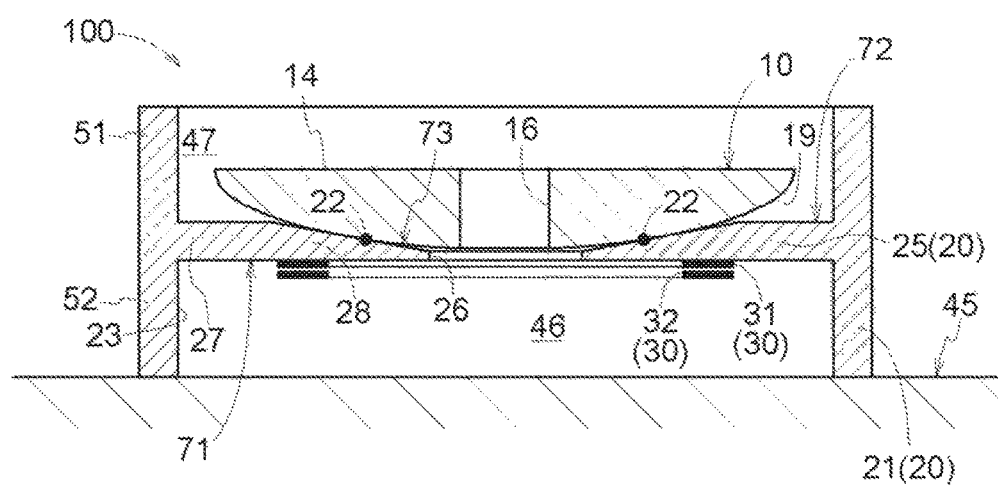
FIG. 9 is a view schematically illustrating a side section of a load detection apparatus of a fourth embodiment.

FIG. 9 illustrates a side sectional view of a load detection apparatus 100 of the fourth embodiment. In the present embodiment, sensors 30 are constituted by a set of a sensor 31 and a sensor 32. The sensors 30 are stacked. That is, one of the sensor 31 and the sensor 32 is disposed on the reverse surface opposite to the surface provided with the contacting portion 22 in the annular portion 25, and the other of the sensor 31 and the sensor 32 is disposed (stacked) on the one of the sensor 31 and the sensor 32.

In the configuration, similarly to the load detection apparatus 100 of the first embodiment, it is possible to appropriately determine whether the sensors 30 and the calculation portions 40 have no abnormality. Further, with the configuration, it is possible to dispose the set of sensors 30 in a reduced space, and further, the set of sensors 30 can detect a load at the same position in a flexure element 20.

Figure 10:
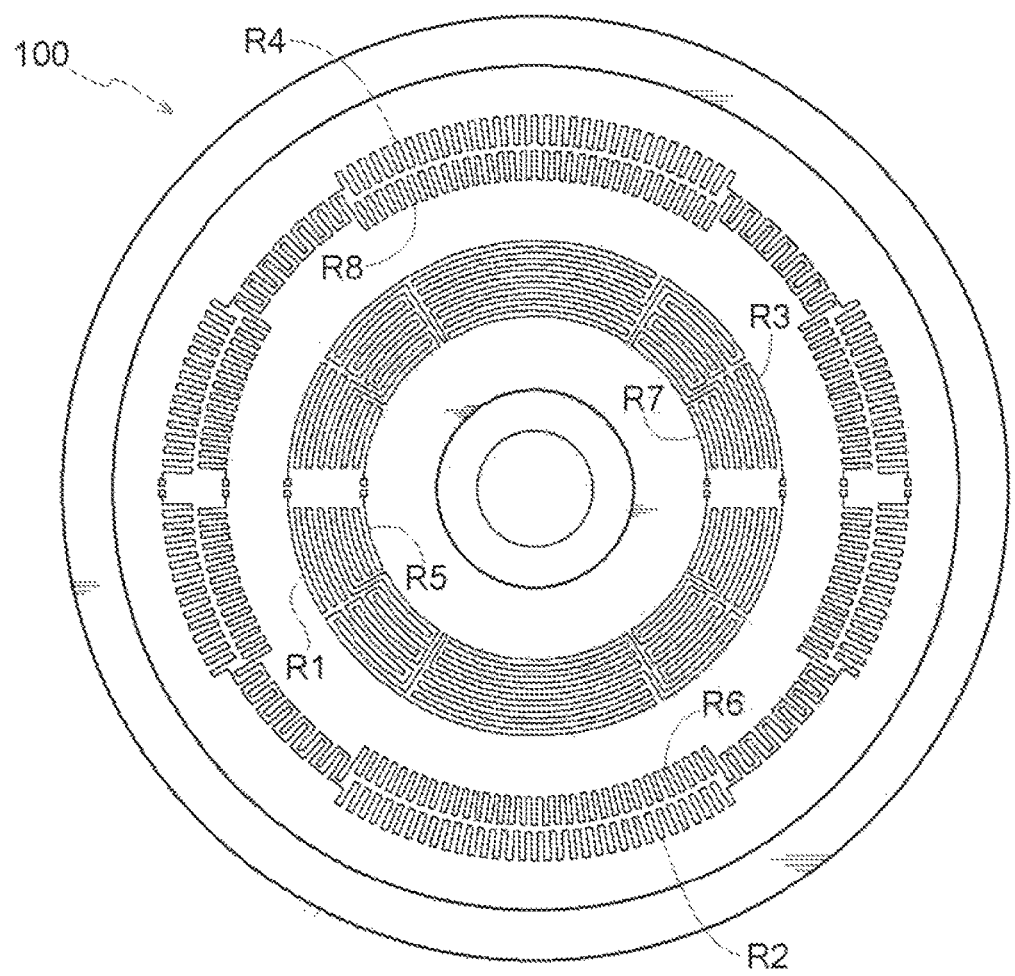
FIG. 10 is a view of a load detection apparatus of another embodiment, when viewed from below.

Next other embodiments will be described. The above embodiment deals with a case where the set of sensors 30 is disposed over an entire circumference along the circumferential direction of the load input portion 10 so that their comb-shaped portions 39 engage with each other. However, as illustrated in FIG. 10, for example, the set of sensors 50 may be disposed such that only parts of the comb-shaped portions 39 in the circumferential direction engage with each other. In other words, engaging part of the comb-shaped portions 39 may be arranged at intervals in the circumferential direction. In the configuration, similarly to the load detection apparatus 100 of the first embodiment, it is possible to appropriately determine whether the sensors 30 and the calculation portions 40 have no abnormally.

The third embodiment deals with an example in which the strain gauges R1 to R8 are each configured such that two strain gauges are serially-connected to each other, and particularly in FIG. 8, the strain gauges on the radially inner side are serially connected to each other and the strain gauges on the radially outer side are serially connected to each other. That is, for example, R11 and R12 are both disposed on the radially inner side, and R51 and R52 are both disposed on the radially outer side. However, one of the strain gauges serially connected to each other may be provided on the radially inner side, and the other of them may be provided on the radially outer side. That is, for example, R12 may be disposed at the position of R51, and R52 may be disposed at the position of R12. With the configuration, it is possible to decrease a variation between detection results obtained by the strain gauges (e.g., a variation between a detection result obtained by R1 and a detection result obtained by R5).

Further, in the Wheatstone bridge circuits of FIG. 6, R1 and R2 are directly connected, R3 and R4 are serially connected, R5 and R6 are directly connected, and R7 and R8 are serially connected. However, R1 and R4 may be directly connected, R2 and R3 may be serially connected, R5 and R8 may be directly connected, and R6 and R7 may be serially connected. Furthermore, in this case, the strain gauge to be connected to a power source and the strain gauge to be grounded can be replaced with each other. That is, the strain gauges may be connected in order of the power supply, R1, R4, and the ground, or the strain gauges may be connected in order of the power supply, R4, R1, and the ground.

The load detection apparatus of the disclosure can be used in various devices that detect a load with the use of a flexure element.

What is claimed is:

1. A load detection apparatus comprising:
a load input portion having a planar input surface into which a load is input, and a curved output surface provided on a side opposite to the input surface;
a flexure element including an annular portion including a contacting portion configured to make contact with at least a part of the output surface, and a support portion configured to support the annular portion such that the annular portion is swingable;
a set of sensors disposed on a reverse surface opposite to a surface provided with the contacting portion in the annular portion, each of the set of sensors being configured to detect distortion corresponding to the load input into the load input portion, and each of the set of sensors including a bridge circuit including four strain gauges;
a set of calculation portions configured to calculate a set of magnitudes of the load by use of respective detection results obtained by the bridge circuits of the set of sensors; and
an abnormality determination portion configured to determine whether the set of sensors and the set of calculation portions have no abnormality, by comparing the set of magnitudes of the load with each other,
wherein the sensors include respective comb-shaped portions each having a comb shape in a top view, and the sensors are disposed such that the comb-shaped portions of one of the sensors are sandwiched between adjacent comb-shaped portions of an other of the sensors.

2. A load detection apparatus comprising:
a load input portion having a planar input surface into which a load is input, and a curved output surface provided on a side opposite to the input surface;
a flexure element including an annular portion including a contacting portion configured to make contact with at least a part of the output surface, and a support portion configured to support the annular portion such that the annular portion is swingable;
a set of sensors disposed on a reverse surface opposite to a surface provided with the contacting portion in the annular portion, each of the set of sensors being configured to detect distortion corresponding to the load input into the load input portion, and each of the set of sensors including a bridge circuit including four strain gauges;
a set of calculation portions configured to calculate a set of magnitudes of the load by use of respective detection results obtained by the bridge circuits of the set of sensors; and
an abnormality determination portion configured to determine whether the set of sensors and the set of calculation portions have no abnormality, by comparing the set of magnitudes of the load with each other,
wherein the sensors include respective comb-shaped portions each having a comb shape in a top view, and the sensors are disposed such that the comb-shaped portions of one of the sensors are sandwiched between adjacent comb-shaped portions of an other of the sensors,
wherein the sensors are disposed such that only parts of the comb-shaped portions in a circumferential direction of the load input portion are sandwiched between each other.

3. The load detection apparatus according to claim 1, wherein the sensors are disposed at intervals along a circumferential direction of the load input portion.

4. The load detection apparatus according to claim 1, wherein the sensors are disposed in parallel to each other along a circumferential direction of the load input portion.

5. The load detection apparatus according to claim 1, wherein the sensors are stacked on top of each other.

* * * * *